US009718138B2

(12) United States Patent
Ishi

(10) Patent No.: US 9,718,138 B2
(45) Date of Patent: Aug. 1, 2017

(54) CUTTING INSERT, CUTTING TOOL, AND METHOD OF PRODUCING MACHINED PRODUCT

(71) Applicant: KYOCERA Corporation, Kyoto-shi, Kyoto (JP)

(72) Inventor: Hirohisa Ishi, Omihachiman (JP)

(73) Assignee: Kyocera Corporation, Kyoto (JP)

( * ) Notice: Subject to any disclaimer, the term of this patent is extended or adjusted under 35 U.S.C. 154(b) by 268 days.

(21) Appl. No.: 14/646,096

(22) PCT Filed: Nov. 27, 2013

(86) PCT No.: PCT/JP2013/081890
§ 371 (c)(1),
(2) Date: May 20, 2015

(87) PCT Pub. No.: WO2014/084252
PCT Pub. Date: Jun. 5, 2014

(65) Prior Publication Data
US 2015/0336186 A1 Nov. 26, 2015

(30) Foreign Application Priority Data

Nov. 30, 2012 (JP) .................................. 2012-261818

(51) Int. Cl.
| B23C 5/20 | (2006.01) |
| B23C 5/22 | (2006.01) |
| B23C 5/06 | (2006.01) |

(52) U.S. Cl.
CPC ............... *B23C 5/207* (2013.01); *B23C 5/06* (2013.01); *B23C 5/20* (2013.01); *B23C 5/202* (2013.01);
(Continued)

(58) Field of Classification Search
CPC ... B23C 5/207; B23C 5/202; B23C 5/20; B23C 5/2247; B23C 2200/366; Y10T 407/23
See application file for complete search history.

(56) References Cited

U.S. PATENT DOCUMENTS 5,593,255 A * 1/1997 Satran .................... B23C 5/109
407/113
8,485,764 B2 * 7/2013 Xu ............................ B23C 5/06
407/113
(Continued)

FOREIGN PATENT DOCUMENTS

| EP | 2436465 A1 | 4/2012 |
| EP | 2 446 992 A1 | 5/2012 |

(Continued)

OTHER PUBLICATIONS

JP 2011-093043 (translation) obtained at https://dossier1.j-platpat.inpit.go.jp/tri/all/odse/ODSE_GM101_Top.action (last visited Apr. 5, 2017).*

(Continued)

*Primary Examiner* — Sunil K Singh
*Assistant Examiner* — Ryan Rufo
(74) *Attorney, Agent, or Firm* — Volpe and Koenig, P.C.

(57) ABSTRACT

A cutting insert has an upper surface, a lower surface, a side surface connected to each of the upper surface and the lower surface, and a cutting edge having sequentially a corner cutting edge, a first straight cutting edge, a second straight cutting edge, and a third straight cutting edge, which are located along an intersection of the upper surface and the side surface and intersect one another at an obtuse angle. The upper surface has a first inclined surface extending along the first straight cutting edge, a second inclined surface extending along the second straight cutting edge, and a third inclined surface extending along the third straight cutting edge. An inclination angle of the second inclined surface (Continued)

with respect to the lower surface is larger than an inclination angle of each of the first inclined surface and the third inclined surface with respect to the lower surface.

6 Claims, 16 Drawing Sheets

(52) U.S. Cl.
CPC .. *B23C 2200/085* (2013.01); *B23C 2200/125* (2013.01); *B23C 2200/205* (2013.01); *B23C 2200/28* (2013.01); *Y10T 407/1936* (2015.01); *Y10T 407/23* (2015.01); *Y10T 407/235* (2015.01); *Y10T 409/303752* (2015.01)

(56) References Cited

U.S. PATENT DOCUMENTS

| | | | |
|---|---|---|---|
| 2006/0039763 A1* | 2/2006 | Lof | B23B 27/141 407/114 |
| 2008/0304924 A1* | 12/2008 | Engstrom | B23C 5/202 407/114 |
| 2012/0070240 A1* | 3/2012 | Ishi | B23C 5/06 407/42 |
| 2012/0155976 A1 | 6/2012 | Ishi | |
| 2012/0275868 A1 | 11/2012 | Saito et al. | |
| 2013/0094913 A1 | 4/2013 | Yoshida | |
| 2014/0199127 A1* | 7/2014 | Imai | B23C 5/202 407/42 |

FOREIGN PATENT DOCUMENTS

| | | | | |
|---|---|---|---|---|
| EP | 2450139 A1 | | 5/2012 | |
| EP | 2474378 A1 | | 7/2012 | |
| EP | 2 489 454 A1 | | 8/2012 | |
| EP | 2 567 768 A1 | | 3/2013 | |
| JP | 2006-088332 A | | 4/2006 | |
| JP | 2007-021658 A | | 2/2007 | |
| JP | 2011-093043 A | * | 5/2011 | B23C 5/20 |
| WO | 2008/078892 A1 | | 7/2008 | |
| WO | 2010/150907 A1 | | 12/2010 | |
| WO | 2011/046121 A1 | | 4/2011 | |
| WO | 2011/138950 A1 | | 11/2011 | |

OTHER PUBLICATIONS

Extended European Search Report, European Patent Application No. 13858960.1, Mar. 18, 2016, 7 pgs.
International Search Report, PCT/JP2013/081890, Dec. 24, 2013, 2 pgs.

* cited by examiner

US 9,718,138 B2

CUTTING INSERT, CUTTING TOOL, AND METHOD OF PRODUCING MACHINED PRODUCT

TECHNICAL FIELD

The present invention relates to a cutting insert, a cutting tool, and a method of producing a machined product.

BACKGROUND ART

An indexable insert described in Japanese Unexamined Patent Publication No. 2006-88332 (Patent Document 1) has conventionally been known as a cutting insert for use in a milling process of a workpiece that becomes a machined product. The cutting insert described in Patent Document 1 has a major cutting edge including two straight shaped portions, and a minor cutting edge. This contributes to reducing a contact length between the cutting edges and the workpiece so as to reduce cutting resistance.

A highly efficient cutting process has been desired in recent years. Hence, there has been a desire for the cutting process in which a cutting tool body configured to attach the cutting insert thereto has a large axial depth of cut and a large amount of feed. In the cutting insert described in Patent Document 1, the major cutting edge is configured to have the straight shaped portions merely having different cutting edge angles, and the upper surface is a flat surface. Therefore, when the depth of cut is increased, the size of the cutting insert may be excessively increased and chip discharge performance may be insufficient because the major cutting edge has a small cutting edge angle.

SUMMARY OF THE INVENTION

A cutting insert according to an embodiment of the present invention has an upper surface, a lower surface, a side surface connected to each of the upper surface and the lower surface, a cutting edge having sequentially a corner cutting edge, a first straight cutting edge, a second straight cutting edge, and a third straight cutting edge, which are located along an intersection of the upper surface and the side surface and intersect one another at an obtuse angle, and a through hole extending from a middle part of the upper surface to a middle part of the lower surface. The upper surface has a first inclined surface that extends along the first straight cutting edge and has a smaller height from a virtual plane orthogonal to a central axis of the through hole as departing from the first straight cutting edge, a second inclined surface that extends along the second straight cutting edge and has a smaller height from the virtual plane as departing from the second straight cutting edge, and a third inclined surface that extends along the third straight cutting edge and has a smaller height from the virtual plane as departing from the third straight cutting edge. An inclination angle of the second inclined surface with respect to the virtual plane is larger than an inclination angle of each of the first inclined surface and the third inclined surface with respect to the virtual plane.

EMBODIMENTS FOR CARRYING OUT THE INVENTION

<Cutting Insert>

Figure 1:
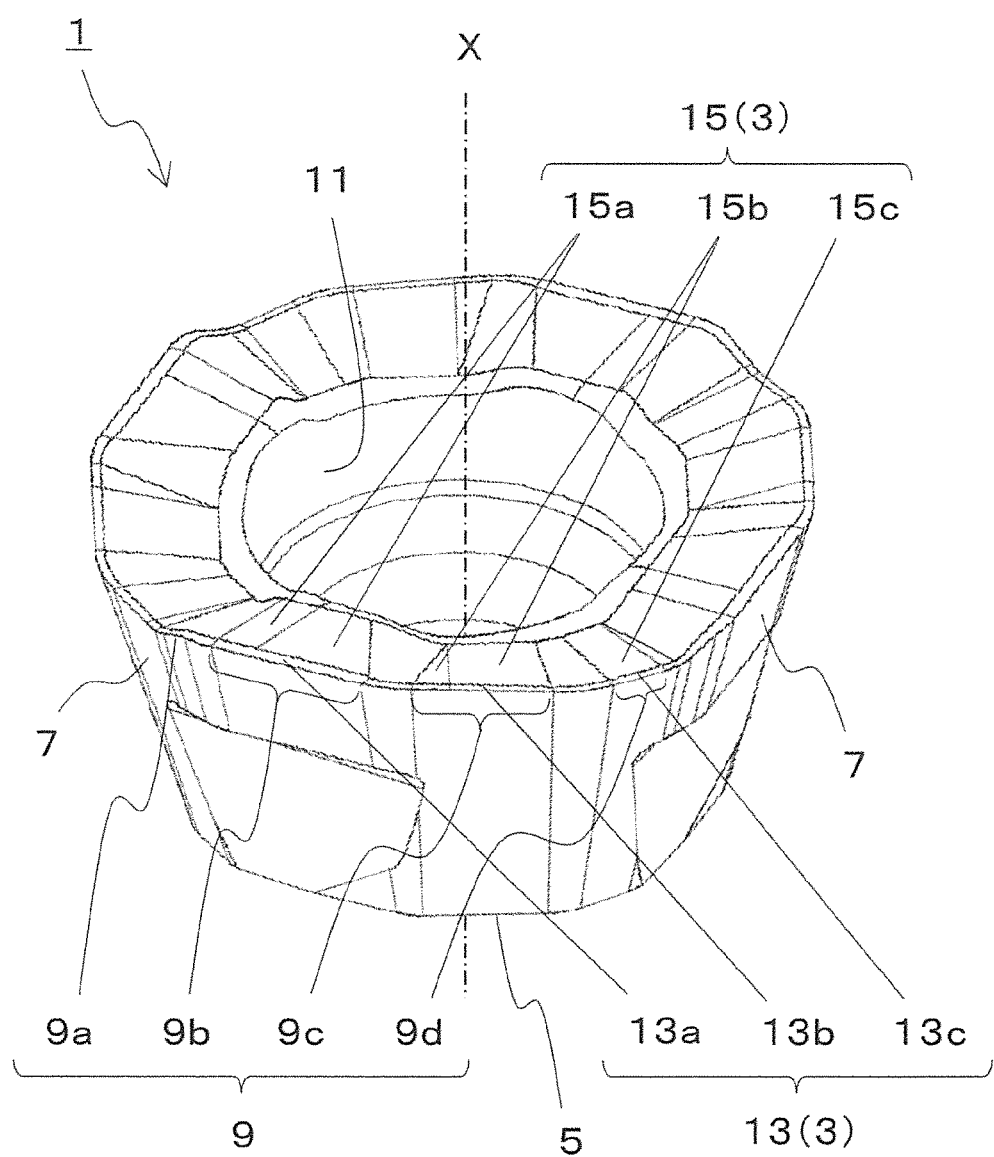
FIG. 1 is a perspective view showing a cutting insert according to an embodiment of the present invention.
Figure 2:
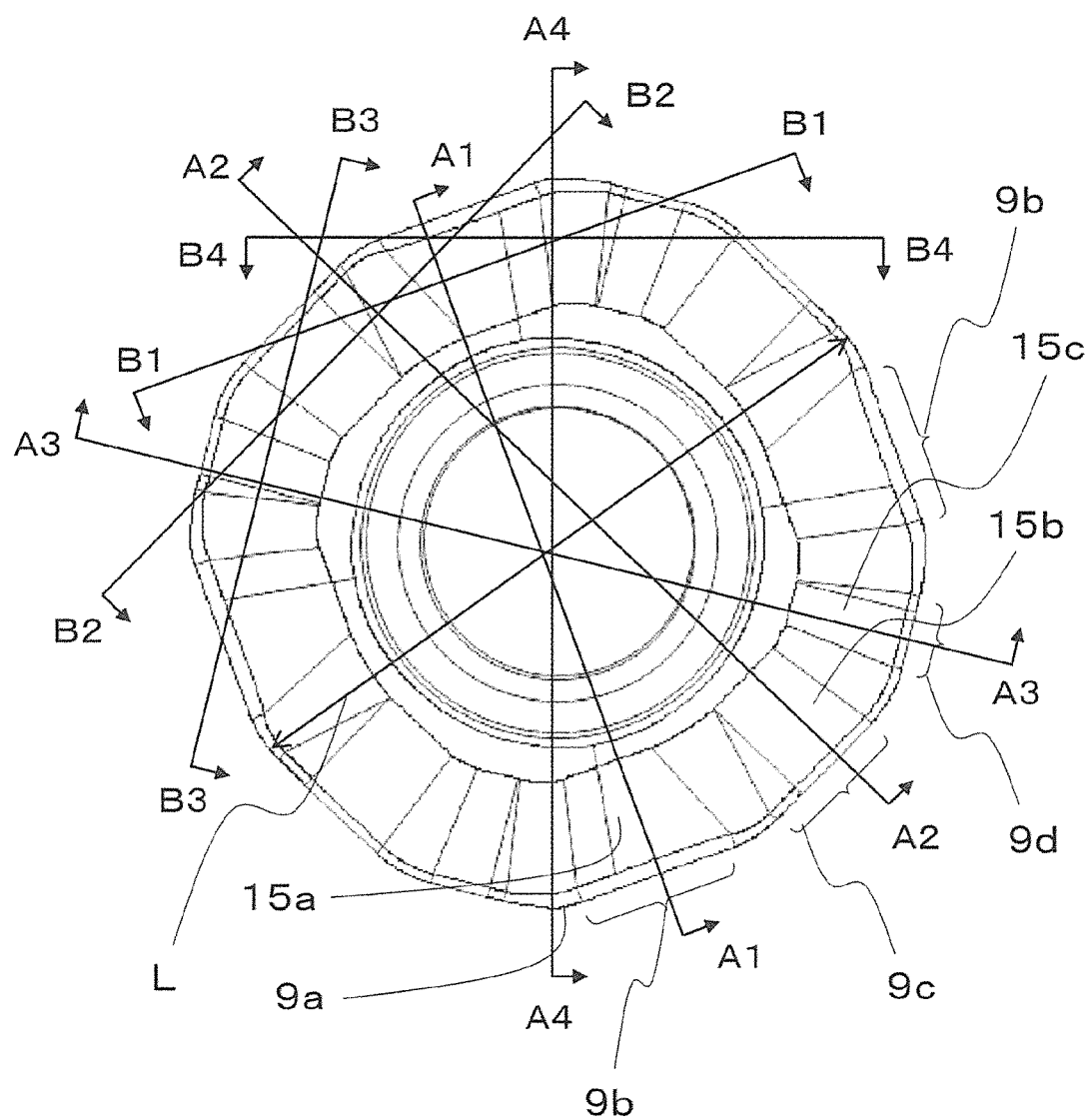
FIG. 2 is a top view of the cutting insert shown in FIG. 1.
Figure 3:
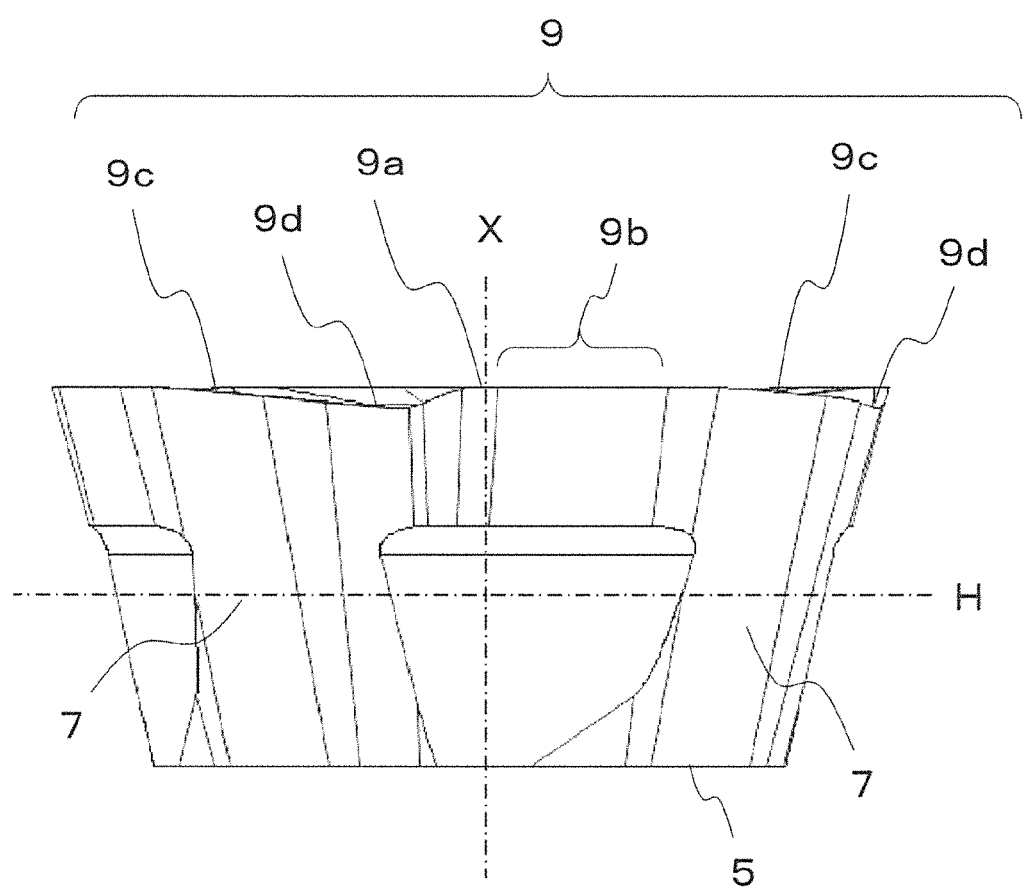
FIG. 3 is a side view of the cutting insert shown in FIG. 1.
Figure 4:
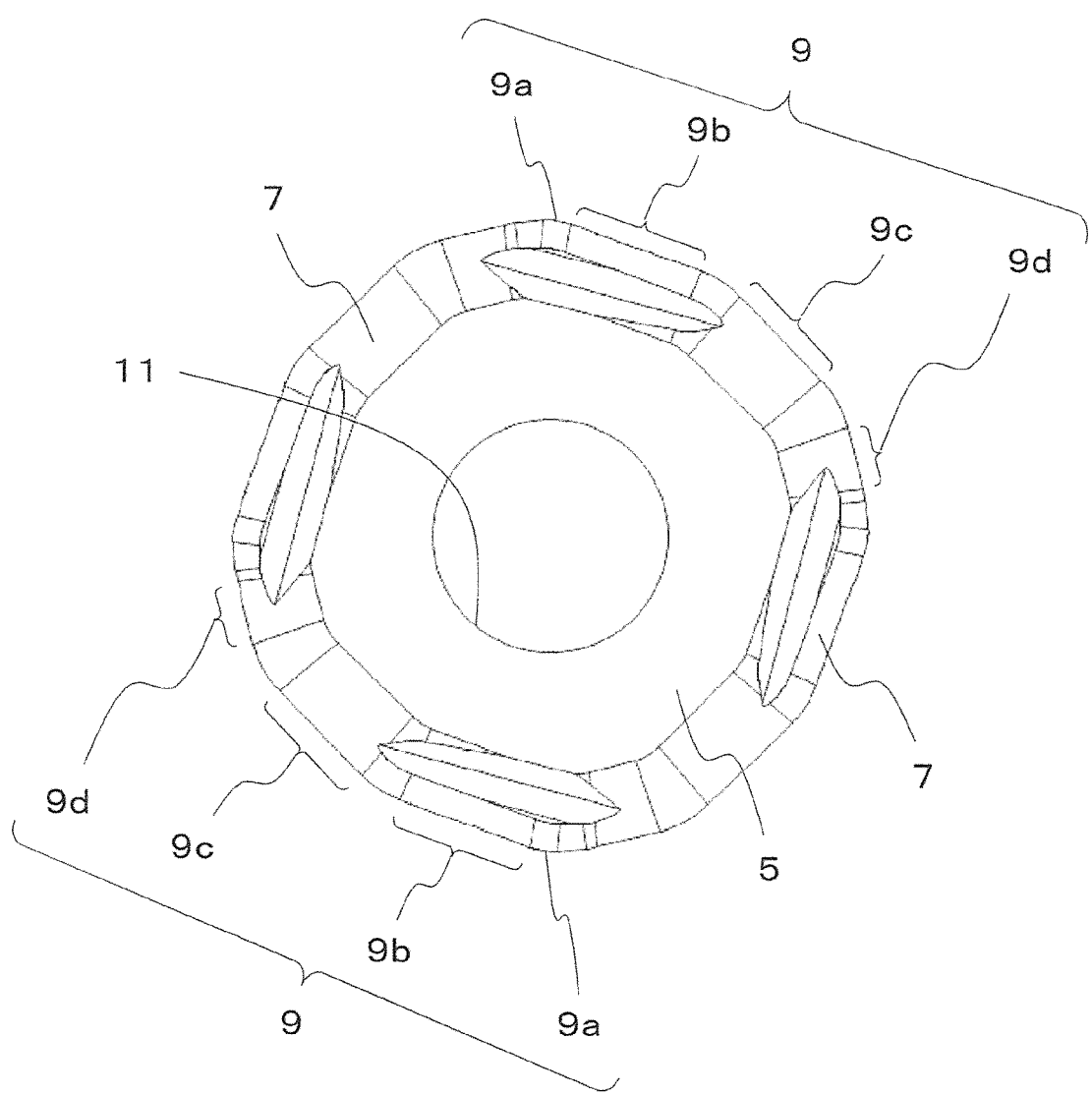
FIG. 4 is a bottom view of the cutting insert shown in FIG. 1.
Figure 5:
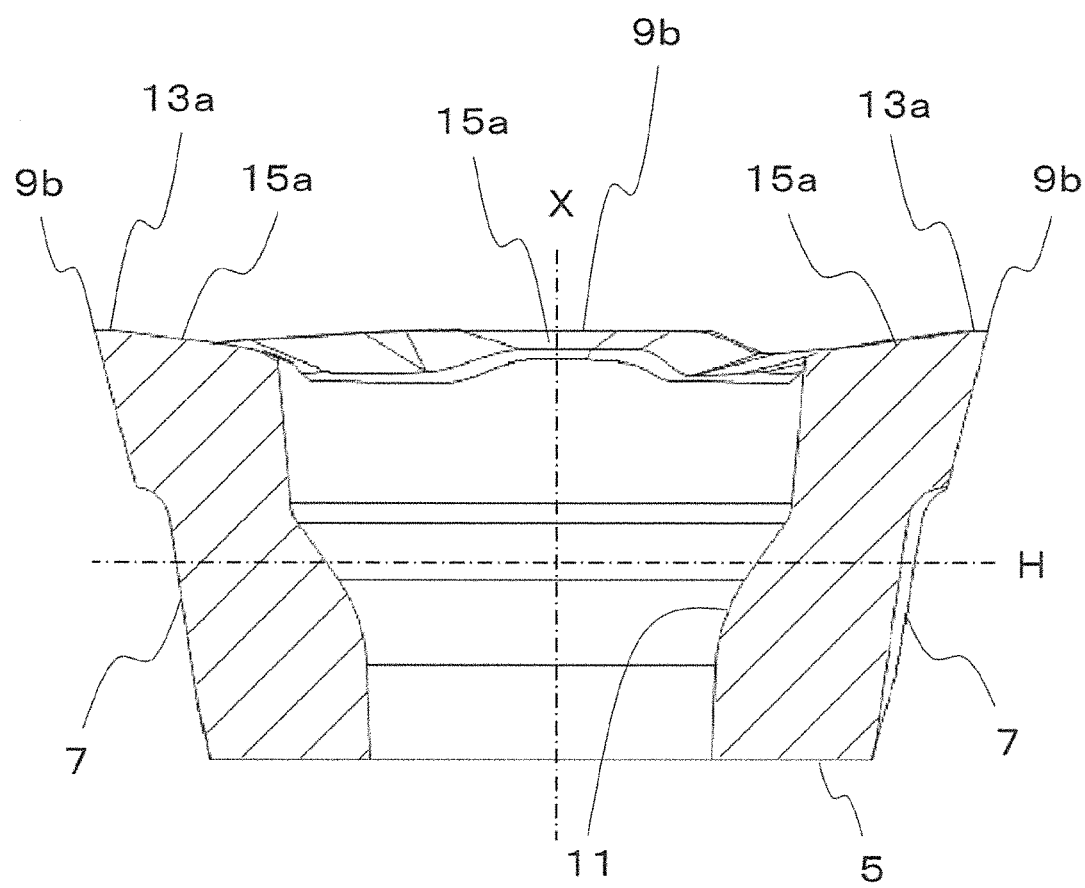
FIG. 5 is a sectional view taken along section line A1-A1 in the cutting insert shown in FIG. 2.
Figure 6:
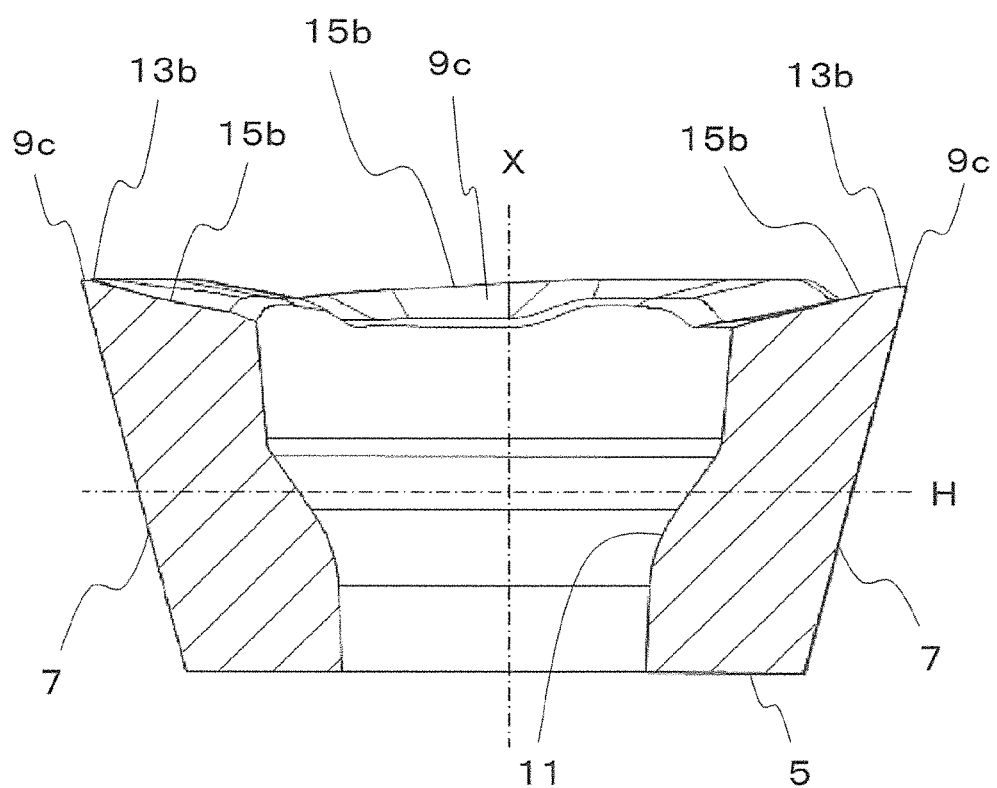
FIG. 6 is a sectional view taken along section line A2-A2 in the cutting insert shown in FIG. 2.
Figure 7:
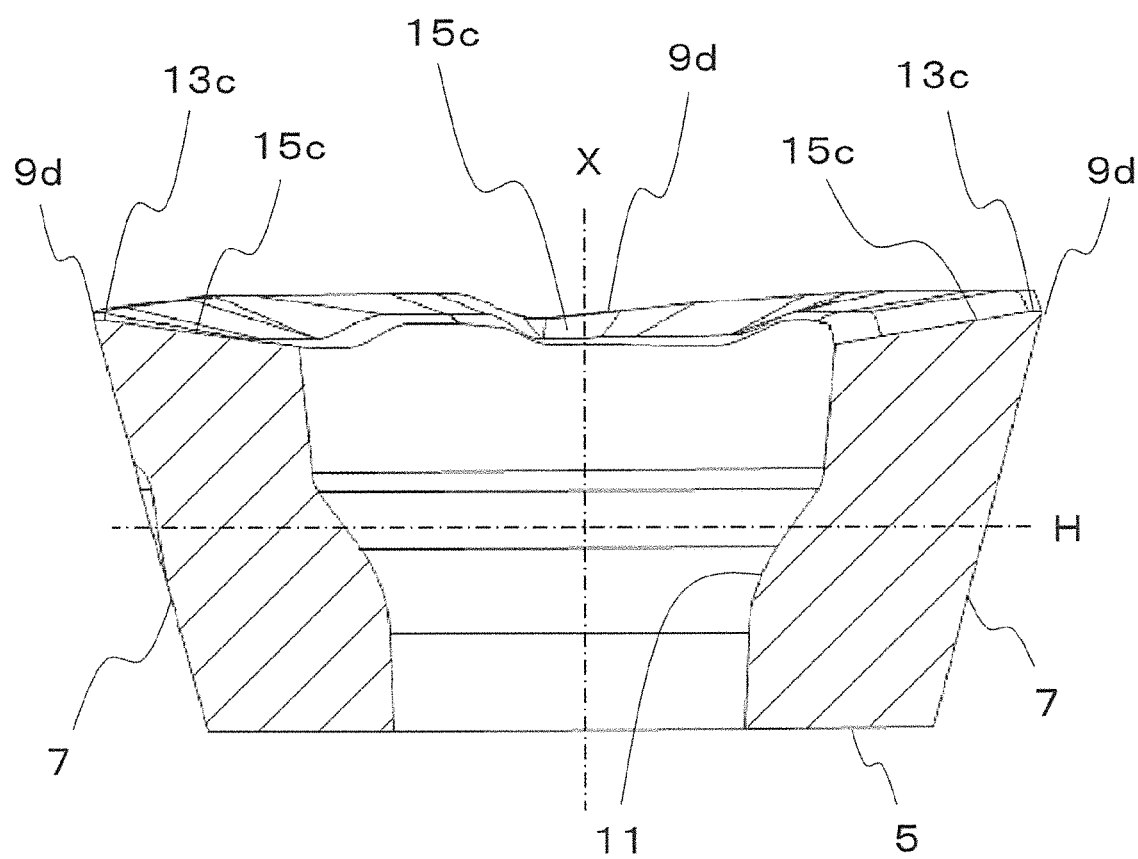
FIG. 7 is a sectional view taken along section line A3-A3 in the cutting insert shown in FIG. 2.
Figure 8:
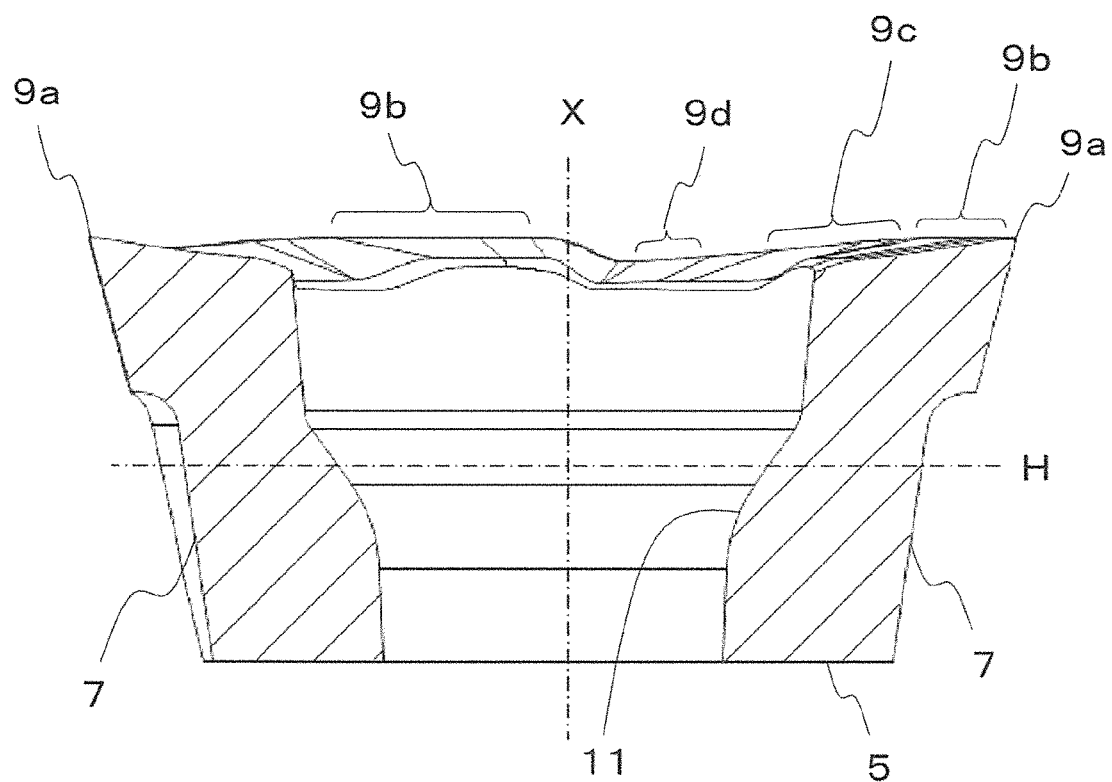
FIG. 8 is a sectional view taken along section line A4-A4 in the cutting insert shown in FIG. 2.
Figure 9:
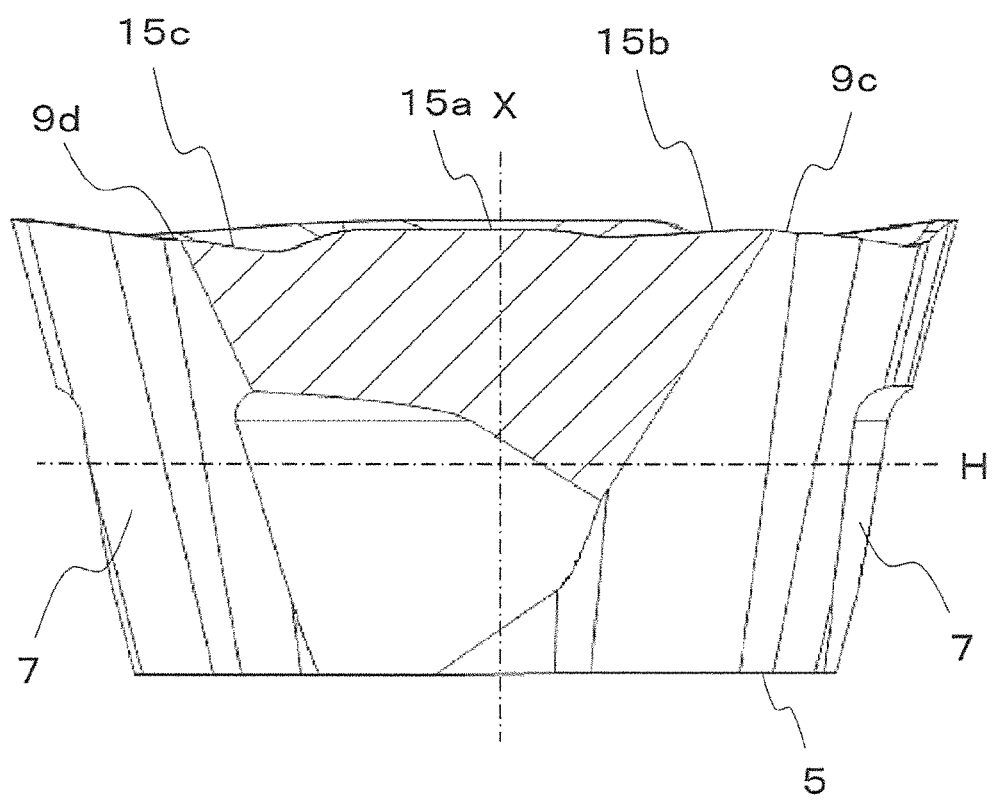
FIG. 9 is a sectional view taken along section line B1-B1 in the cutting insert shown in FIG. 2.
Figure 10:
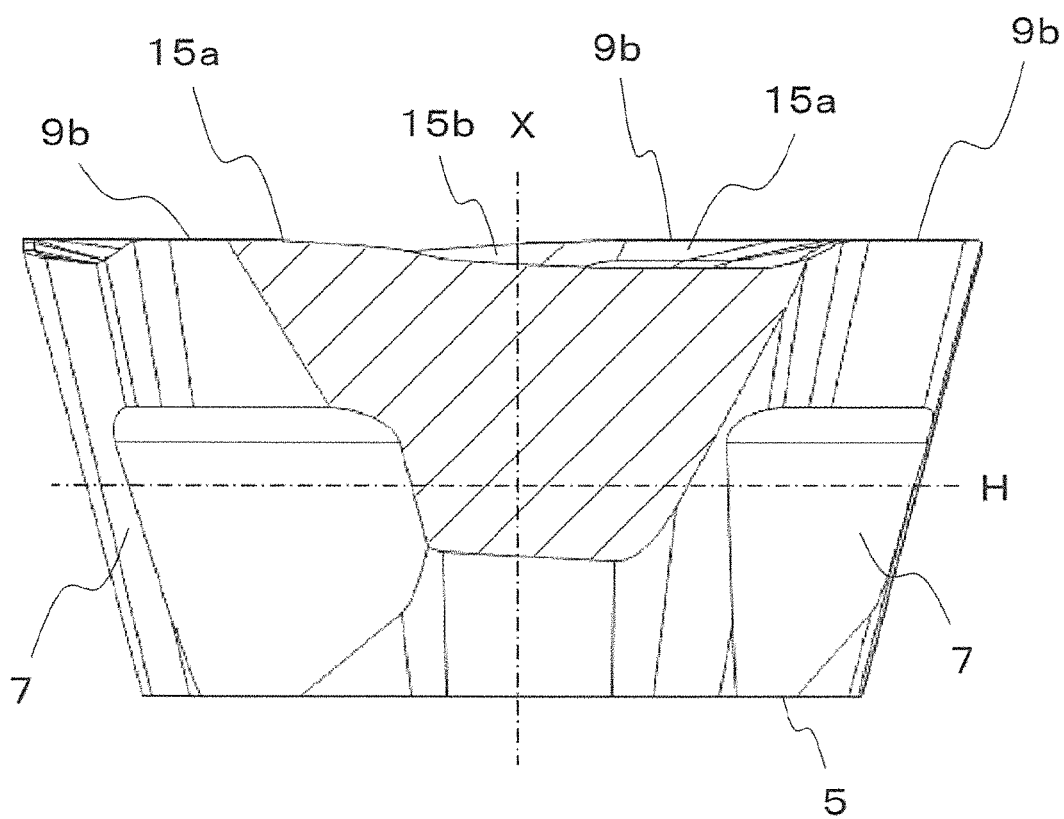
FIG. 10 is a sectional view taken along section line B2-B2 in the cutting insert shown in FIG. 2.
Figure 11:
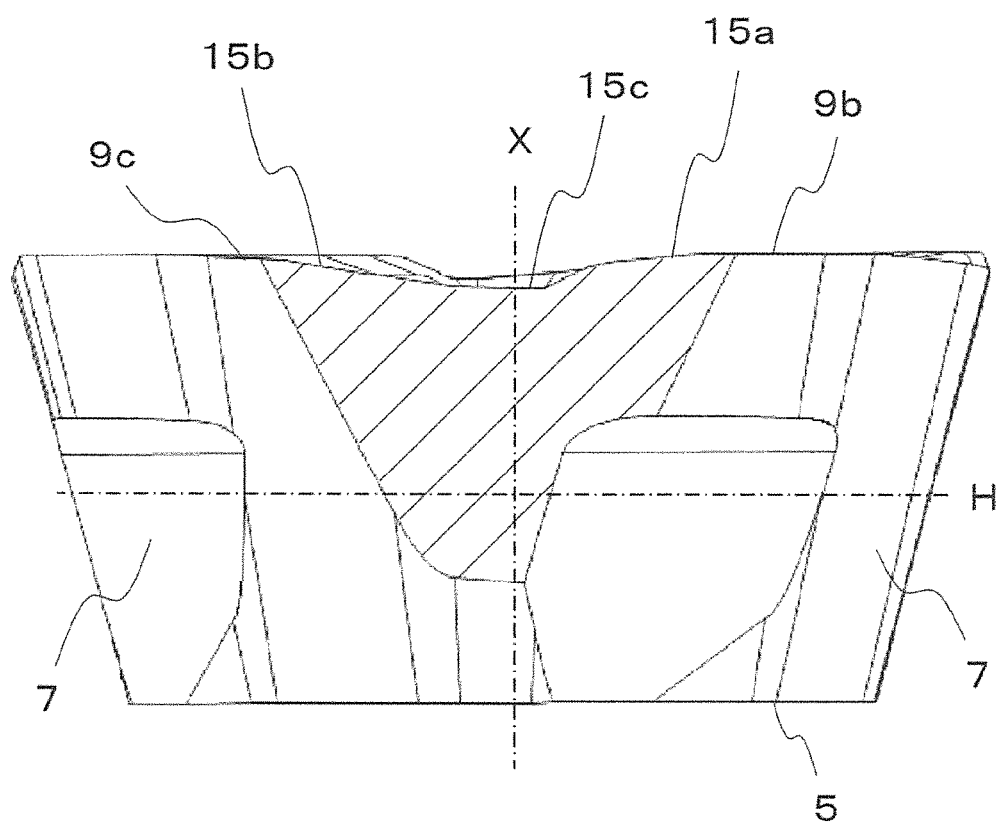
FIG. 11 is a sectional view taken along section line B3-B3 in the cutting insert shown in FIG. 2.
Figure 12:
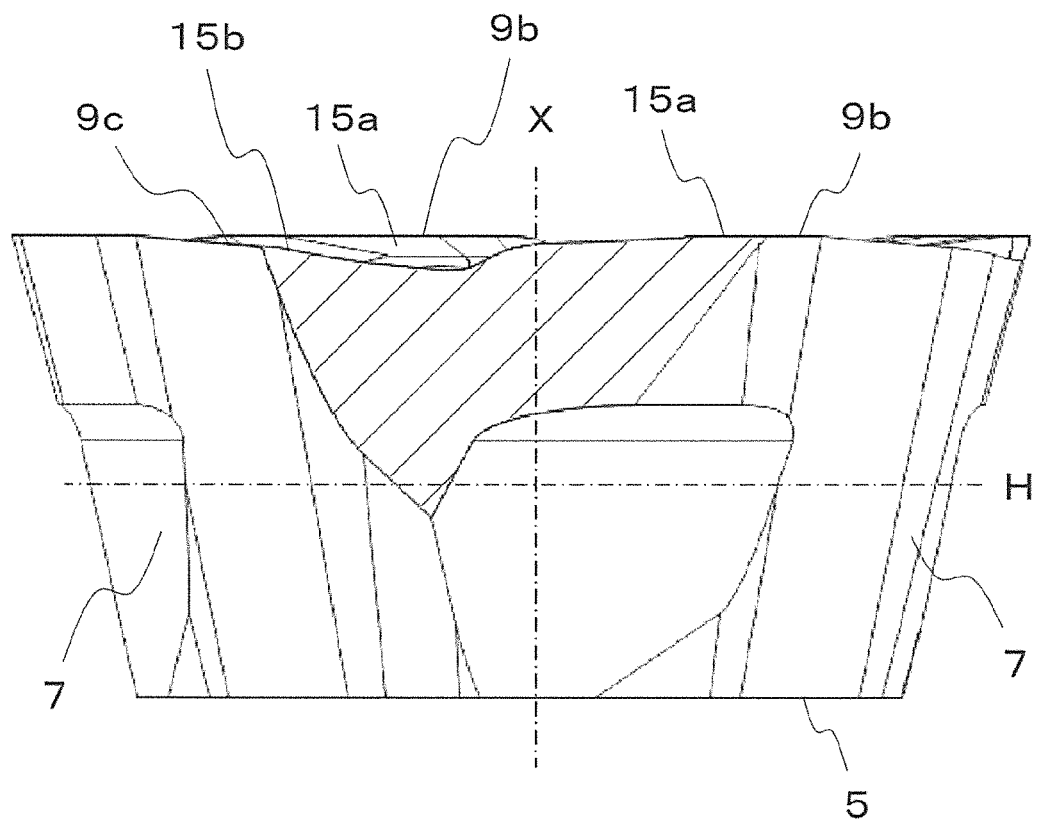
FIG. 12 is a sectional view taken along section line B4-B4 in the cutting insert shown in FIG. 2.

A cutting insert 1 of an embodiment is described in detail below with reference to the drawings. For the sake of convenience in the description, the drawings referred to in the following show, in simplified form, only major elements among components of the embodiment which are necessary for describing the present invention. Therefore, the cutting insert 1 of the present invention may have any optional component not shown in these drawings referred to in the present specification. The sizes of the components in these drawings are not faithful to the actual sizes of the components and to the actual size ratio of the components.

As shown in FIGS. 1 to 12, the cutting insert 1 of the present embodiment has an upper surface 3, a lower surface 5, and a side surface 7. The side surface 7 is connected to each of the upper surface 3 and the lower surface 5. A cutting edge 9 is disposed along an intersection of the upper surface 3 and the side surface 7. The cutting insert 1 of the present embodiment has a central axis X passing through a center of the lower surface 5 and a center of the upper surface 3. The cutting insert 1 also has a through hole 11 extending from a middle part of the upper surface 3 and a middle part of the lower surface 5. The through hole 11 opens to the middle part of the upper surface 3 and the middle part of the lower surface 5. Therefore, the central axis of the through hole 11 in the insert 1 of the present embodiment coincides with the central axis X, and a penetrating direction of the through hole 11 is parallel to the central axis X. The lower surface 5 is a flat surface, and the central axis X is orthogonal to the lower surface 5. The through hole 11 is disposed to insert a screw therein when the cutting insert 1 is screwed into a holder of a cutting tool.

The upper surface 3 and the lower surface 5 have an approximately polygonal shape having a plurality of straight line portions in a top view. The upper surface 3 and the lower surface 5 are not strictly a polygon. Specifically, the plurality of straight line portions constituting a part of the outer periphery are respectively connected by a curved line. The lower surface 5 is smaller than the upper surface 3 and has a shape approximately similar to the upper surface 3. Therefore, the side surface 7 is inclined so as to approach the central axis X from a portion of the side surface 7 which is connected to the upper surface 3 toward a portion of the side surface 7 which is connected to the lower surface 5 in a side view.

The upper surface 3 and the lower surface 5 in the cutting insert 1 of the present embodiment have a maximum width of 5 to 20 mm. The height between the lower surface 5 and the upper surface 3 is 2 to 8 mm. Here, the maximum width of the upper surface 3 denotes a maximum value of the width of the upper surface 3 in the top view, and may be rephrased into the diameter of a circle circumscribed to the upper surface. Specifically, the maximum width of the upper surface 3 is indicated by width L in FIG. 2. Similarly, the maximum width of the lower surface 5 denotes a maximum value of the width of the lower surface 5 in a bottom view. Specifically, the diameter of a virtual circumscribed circle with respect to the lower surface 5 is the maximum width. The height between the lower surface 5 and the upper surface 3 denotes the height between an upper end of the upper surface 3 and a lower end of the lower surface 5 in a direction parallel to the central axis X.

For example, cemented carbide or cermet is usable as a material of the cutting insert 1. Examples of the composition of cemented carbide include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. The cermet is a sintered composite material obtained by compositing metal with a ceramic ingredient. Specifically, the sintered composite material is composed mainly of a titanium compound, such as titanium carbide (TiC) or titanium nitride (TiN).

The surface of the cutting insert 1 may be coated with a film by chemical vapor deposition (CVD) method or physical vapor deposition (PVD) method. Examples of the composition of the film include titanium carbide (TiC), titanium nitride (TiN), titanium carbonitride (TiCN), and alumina ($Al_2O_3$).

The cutting edge 9 is disposed along the intersection of the upper surface 3 and the side surface 7. The cutting edge 9 of the present embodiment has sequentially a corner cutting edge 9a, a first straight cutting edge 9b, a second straight cutting edge 9c, and a third straight cutting edge 9d. These cutting edge areas respectively intersect the cutting edge area adjacent thereto at an obtuse angle. Here, "intersecting at the obtuse angle" is described as follows. That is, for example, the second straight cutting edge 9c is adjacent to each of the first straight cutting edge 9b and the third straight cutting edge 9d. A straight line parallel to the second straight cutting edge 9c and a straight line parallel to the first straight cutting edge 9b intersect each other at the obtuse angle, and the straight line parallel to the second straight cutting edge 9c and a straight line parallel to the third straight cutting edge 9d intersect each other at the obtuse angle.

Attachment to the holder of the cutting tool is usually done so that the corner cutting edge 9a is located on the frontmost end side of the holder. The first straight cutting edge 9b is adjacent to the corner cutting edge 9a, and the first straight cutting edge 9b and the corner cutting edge 9a intersect each other at an obtuse angle. This means that a tangent being in contact with a portion of the corner cutting edge 9a which is located close to the frontmost end side of the holder, and the straight line parallel to the first straight cutting edge 9b intersect each other at the obtuse angle. Here, the corner cutting edge 9a is not necessarily required to have the straight line shaped portion.

The cutting edge areas adjacent to each other in the cutting edge areas constituting the cutting edge 9 intersect each other at an obtuse angle. For example, in FIG. 2, setting is made so that the tangent being in contact with the portion of the corner cutting edge 9a located close to the frontmost end side of the holder and the first straight cutting edge 9b intersect each other at an angle of 160 degrees, the first straight cutting edge 9b and the second straight cutting edge 9c intersect each other at an angle of 155 degrees, and the second straight cutting edge 9c and the third straight cutting edge 9d intersect each other at an angle of 150 degrees.

The cutting insert 1 is attached to the holder so that the corner cutting edge 9a is located on the frontmost end side of the holder. Consequently, the tangent being in contact with the portion of the corner cutting edge 9a located close to the frontmost end side and each of the first straight cutting edge 9b, the second straight cutting edge 9c, and the third straight cutting edge 9d form an angle that is a so-called cutting edge angle. For example, the cutting insert 1 is attached to the holder so as to ensure that the first straight cutting edge 9b has a cutting edge angle of 10 to 25 degrees, the second straight cutting edge 9c has a cutting edge angle of 45 degrees, and the third straight cutting edge 9d has a cutting edge angle of 75 degrees.

In the case of the two straight shaped cutting edge areas, it is necessary to increase the cutting edge areas in order to increase the depth of cut, or it is necessary to increase the cutting edge angle of the cutting edge area having a relatively large cutting edge angle, which is the cutting edge area located on the outer peripheral side of the holder when attached to the holder. However, in the former case, the size of the whole cutting insert needs to be excessively increased. In the latter case, the two cutting edge areas adjacent to each other intersect each other at a small angle, and therefore, the strength between these two cutting edge areas can be lowered to cause a fracture.

However, the cutting insert 1 of the present embodiment has the three cutting edge areas that are different from one another in cutting edge angle as described above. This eliminates the need to excessively increase the size of the whole cutting insert 1 while decreasing the cutting edge angle of the first straight cutting edge 9b, and also eliminates the need to excessively decrease the angle of intersection between the adjacent cutting edge areas.

Although the first straight cutting edge 9b, the second straight cutting edge 9c, and the third straight cutting edge 9d are adjacent to one another, they need not to be directly connected to one another. That is, they may be connected to one another by a protruding curved line shaped cutting edge area. The protruding curved line shaped cutting edge area contributes to suppression of extreme deterioration in the strength of a boundary where the straight line shaped cutting edge areas intersect each other.

In the cutting insert 1 of the present embodiment, a length of the second straight cutting edge 9c is longer than a length of the third straight cutting edge 9d, and a length of the first straight cutting edge 9b is longer than the length of the second straight cutting edge 9c.

The cutting edge 9 in the cutting insert 1 of the present embodiment has four groups of the corner cutting edge 9a, the first straight cutting edge 9b, the second straight cutting edge 9c, and the third straight cutting edge 9d, which are sequentially disposed. These four groups are disposed adjacent to one another. One located adjacent to the right-hand side of the corner cutting edge 9a in a certain group is the first straight cutting edge 9b in the same group, and one located adjacent to the left-hand side of the corner cutting edge 9a is the third straight cutting edge 9d in a different group. In other words, the corner cutting edge 9a indicates a curved line shaped cutting edge area connecting the first straight cutting edge 9b and the third straight cutting edge 9d in the groups adjacent to each other.

Although in the cutting insert 1 of the present embodiment, one located adjacent to the right-hand side of the corner cutting edge 9a in a certain group is the first straight cutting edge 9b in the same group, and one located adjacent to the left-hand side of the corner cutting edge 9a is the third straight cutting edge 9d in a different group, or vice versa. That is, one located adjacent to the left-hand side of the corner cutting edge 9a in a certain group may be the first straight cutting edge 9b in the same group, and one located adjacent to the right-hand side of the corner cutting edge 9a may be the third straight cutting edge 9d in a different group.

A certain group of the corner cutting edge 9a, the first straight cutting edge 9b, the second straight cutting edge 9c, and the third straight cutting edge 9d is used during a cutting process. When the group in use is worn, a different group in the cutting edge 9 which is not used yet may be used by turning the cutting insert 1 through 90 degrees with respect to the central axis X of the through hole 11.

The intersection of the upper surface 3 and the side surface 7, along which the cutting edge 9 is disposed, does not have a strict linear shape formed by two intersecting surfaces. The strength of the first major cutting edge 9, the second major cutting edge 9, and the first corner cutting edge 9a can deteriorate when the intersection of the upper surface 3 and the side surface 7 is sharpened at an acute angle. Therefore, a so-called horning process may be applied so that a region where the upper surface 3 and the side surface 7 intersect each other has a slight curved surface shape.

The upper surface 3 has a land surface 13 and a rake surface 15. The land surface 13 is disposed along the cutting edge 9. That is, the land surface 13 is located along an outer peripheral edge of the upper surface 3 and is connected to the cutting edge 9. The cutting edge 9 is disposed along an intersection of the land surface 13 and the side surface 7. The land surface 13 is disposed to enhance the strength of the cutting edge 9. In the absence of the land surface 13, the cutting edge 9 is to be disposed along an intersection of the rake surface 15 and the side surface 7.

The rake surface 15 located further inside than the land surface 13 is the inclined surface whose height from a virtual plane H orthogonal to the central axis of the through hole 11 decreases toward a center as described later. The term "virtual plane H" denotes the virtual plane that is the plane orthogonal to the central axis of the through hole 11 and located lower than the upper surface 3. FIG. 3 and FIGS. 5 to 12 are the drawings taken from the side. Therefore, the virtual plane H is illustrated in a straight line shape in these drawings.

The central axis of the through hole 11 coincides with the central axis X, and hence the virtual plane H is orthogonal to the central axis X. In the insert 1 of the present embodiment, the lower surface 5 is the flat surface and orthogonal to the central axis X, and therefore, the height from the virtual plane H may be rephrased into the height from the lower surface 5. An inclination angle of the rake surface 15 is larger than an inclination angle of the land surface 13. The land surface 13 is approximately parallel to the lower surface 5 in the cutting insert 1 of the present embodiment.

That is, the strength of the cutting edge 9 can be enhanced by including the land surface 13 with the inclination angle smaller than the inclination angle of the rake surface 15. The term "inclination angle" denotes an angle formed by a surface parallel to the lower surface 5 in a section including the central axis X and a target surface. A width of the land surface 13, which is indicated by the distance between an outer periphery of the upper surface 3 and an outer periphery of the rake surface 15, is properly set according to cutting conditions, for example, in the range of 1 mm or less.

The rake surface 15 is located further inside than the land surface 13. The rake surface 15 has a role in scooping chips generated by the cutting edge 9. Therefore, the chips of a workpiece flow along the surface of the rake surface 15. The rake surface 15 is inclined so that the height thereof from the lower surface 5 decreases as departing from the land surface 13, in order to satisfactorily scoop the chips.

In other words, in the cutting insert 1 of the present embodiment, the rake surface 15 is the inclined surface whose height decreases toward the center of the upper surface 3. A width of the rake surface 15, which is indicated by a distance between the outer periphery of the rake surface 15 and an inner periphery of the rake surface 15 in the top view, is properly set according to cutting conditions.

The cutting insert 1 of the present embodiment has, as the rake surface 15 whose height from the lower surface 5 decreases as departing from the cutting edge 9, a first inclined surface 15a disposed along the first straight cutting edge 9b, a second inclined surface 15b disposed along the second straight cutting edge 9c, and a third inclined surface 15c disposed along the third straight cutting edge 9d.

That is, the first inclined surface 15a is disposed along the first straight cutting edge 9b so that the height from the lower surface 5, namely, the virtual plane H decreases as departing from the first straight cutting edge 9b. The second inclined surface 15b is disposed along the second straight cutting edge 9c so that the height from the lower surface 5 (the virtual plane H) decreases as departing from the second straight cutting edge 9c. The third inclined surface 15c is disposed along the third straight cutting edge 9d so that height from the lower surface 5 (the virtual plane H) decreases as departing from the third straight cutting edge 9d.

In the cutting insert 1 of the present embodiment, an inclination angle of the second inclined surface 15b with respect to the lower surface 5 is larger than each of an inclination angle of the first inclined surface 15a and the third inclined surface 15c with respect to the lower surface 5. The first inclined surface 15a, which is the inclined surface along the first straight cutting edge 9b that may receive a large impact because of being firstly brought into contact with the workpiece during the cutting process, and the third inclined surface 15c, which is the inclined surface along the third straight cutting edge 9d that has the large cutting edge angle to facilitate generation of chips having a large thickness, have a relatively small inclination angle, thus ensuring the enhancement of strength of these areas. Moreover, the second inclined surface 15b, which is the inclined surface along the second straight cutting edge 9c to be subjected to relatively less cutting resistance, has a relatively large inclination angle. These ensure more satisfactory chip discharge performance than the case where the entirety of the inclined surface merely has a small inclination angle.

Further, the inclination angle of the first inclined surface 15a disposed along the first straight cutting edge 9b is smaller than the inclination angle of the second inclined surface 15b disposed along the second straight cutting edge 9c. This ensures that a curling diameter of chips generated by the first straight cutting edge is smaller than a curling diameter of chips generated by the second straight cutting edge 9c. It is therefore possible to reduce a chip biting at the first straight cutting edge 9b having a small distance from the workpiece.

Thus, the first inclined surface 15a, the second inclined surface 15b, and the third inclined surface 15c do not have the same inclination angle. Additionally, these inclination angles are not monotonously decreased so that the first inclined surface has the largest inclination angle and the third inclined surface has the smallest inclination angle. This ensures a satisfactory cutting process even under a large axial depth of cut and a large amount of feed.

The inclination angles of the first inclined surface 15a and the third inclination angle are set to, for example, −5 to 20 degrees. The inclination angle of the second inclined surface 15b is set to, for example, 10 to 30 degrees so as to have a larger value than the inclination angles of the first inclined surface 15a and the third inclination angle.

The cutting insert 1 of the present embodiment has, as the land surface 13 disposed along the cutting edge 9, a first land surface 13a disposed along the first straight cutting edge 9b, a second land surface 13b disposed along the second straight cutting edge 9c, and a third land surface 13c disposed along the third straight cutting edge 9d. That is, the first land surface 13a is located between the first straight cutting edge 9b and the first inclined surface 15a. The second land surface 13b is located between the second straight cutting edge 9c and the second inclined surface 15b. The third land surface 13c is located between the third straight cutting edge 9d and the third inclined surface 15c.

The first land surface 13a has a larger width than the second land surface 13b and the third land surface 13c. The first straight cutting edge 9b is to be firstly brought into contact with the workpiece during the cutting process, and is therefore apt to receive a large impact than the second land surface 13b and the third land surface 13c. However, when the width of the first land surface 13a, which is apt to receive a relatively large impact, is relatively large, making it possible to enhance the durability of the first land surface 13a. The term "the width of the land surface 13" denotes the width between the cutting edge 9 and the rake surface 15, namely, the width between an outer peripheral end of the land surface 13 which is adjacent to the cutting edge 9 and an inner peripheral end thereof adjacent to the rake surface 15.

The first straight cutting edge 9b is parallel to the lower surface 5, and the second straight cutting edge 9c and the third straight cutting edge 9d are inclined so as to have a smaller height from the lower surface 5 as departing from the first straight cutting edge 9b in the side view. With the cutting edge 9 thus configured, it is possible to suppress cutting resistance even in the areas of the second straight cutting edge 9c and the third straight cutting edge 9d, both of which have the relatively large cutting edge angle, thereby increasing the chip thickness. It is also possible to make it easier for the chips generated by the cutting edge to be discharged in a direction away from the workpiece 201, thereby reducing the chip biting at the second straight cutting edge 9c and the third straight cutting edge 9d.

<Cutting Tool>

A cutting tool 101 according to an embodiment of the present invention is described below with reference to the drawings.

Figure 13:
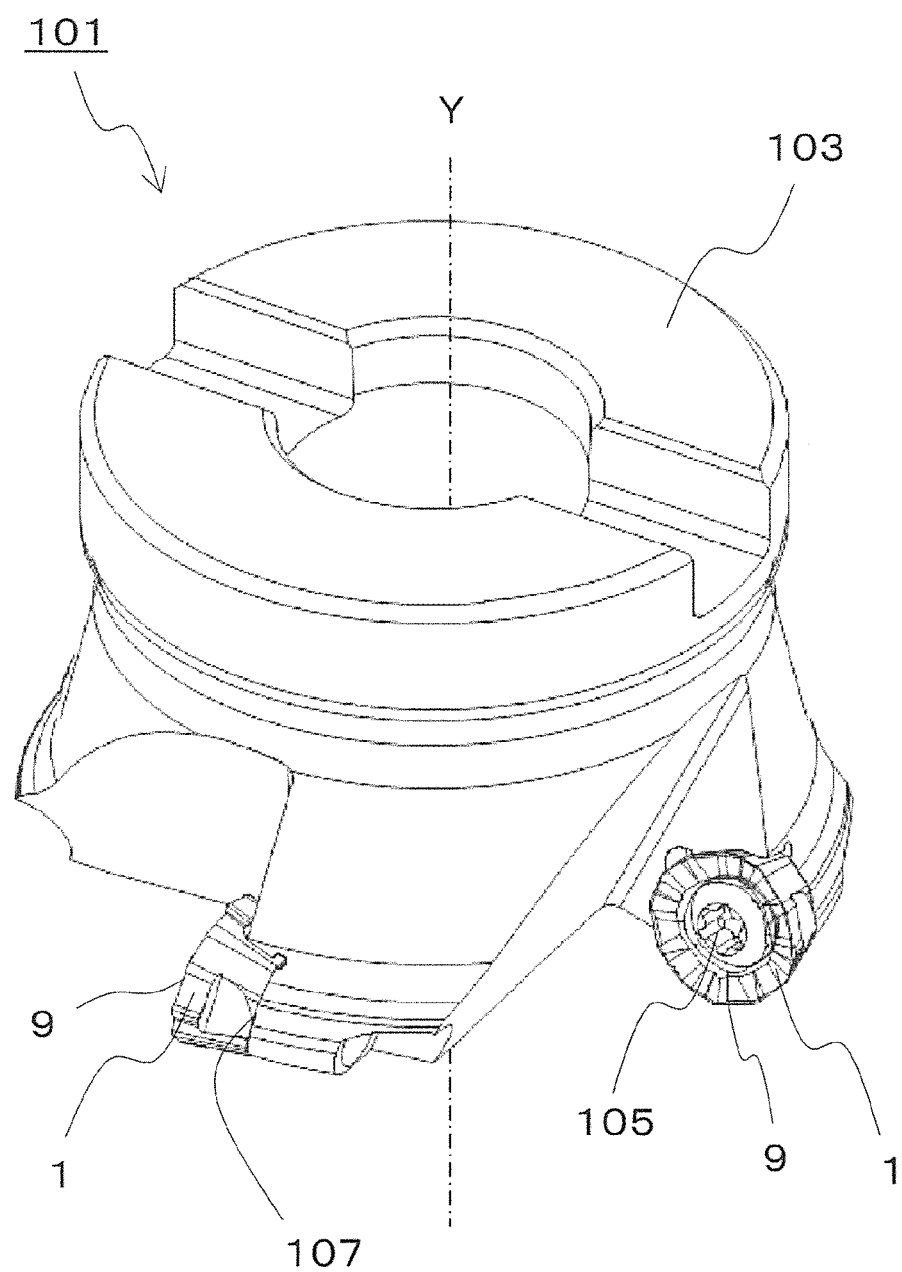
FIG. 13 is a perspective view showing a cutting tool according to an embodiment of the present invention.

As shown in FIG. 13, the cutting tool 101 of the present embodiment has a holder 103 that has a rotation center axis Y and has a plurality of insert pockets 107 on the front end side of the outer periphery of the holder 103, and the foregoing cutting inserts 1 to be respectively attached to the insert pockets 107 so that the cutting edge 9 projects sidewardly of the holder 103.

The holder 103 has an approximately rotary body shape to be rotated around the rotation center axis Y. The insert pockets 107 are disposed at regular intervals along the outer peripheral surface on the front end side of the holder 103. The insert pockets 107 are configured to attach the cutting insert 1 thereto and open to the outer peripheral surface and a front end surface of the holder 103. Specifically, each of the insert pockets 107 has a seating surface opposed to a rotational direction, and two constraining side surfaces located in a direction intersecting the seating surface.

The cutting insert 1 is to be attached to each of the plurality of insert pockets 107 disposed on the holder 103. The cutting insert 1 is to be attached to the holder 103 so that the first straight cutting edge, the second straight cutting edge, and the third straight cutting edge project from the front end or outer periphery of the holder 103.

According to the present embodiment, the cutting insert 1 is attached to the insert pocket 107 by a screw 105. That is, the cutting insert 1 is fixed to the holder 103 by inserting the screw 105 into the through hole 11 of the cutting insert 1, and by inserting the front end of the screw 105 into a screw hole (not shown) disposed in the insert pocket 107 so as to screw together screw portions.

According to the present embodiment, the cutting insert 1 is attached to the holder 103 so that the cutting edge 9 projecting outward from the outer peripheral surface has a positive axial rake angle and a negative radial rake angle. Although the radial rake angle is negative in the present embodiment, it may also be positive depending on machining conditions.

Steel, cast iron, or the like is usable for the holder 103. Among others, high-rigidity steel is preferably used.

<Method of Producing Machined Product>

A method of producing a machined product according to an embodiment of the present invention is described below with reference to the drawings.

The machined product is produced by subjecting a workpiece to a cutting process. The method of producing the machined product according to the present embodiment has the following steps:

(1) rotating the cutting tool 101 as represented by the foregoing embodiment;

(2) bringing the cutting edge 9 of the cutting tool 101 being rotated into contact with the workpiece 201; and (3) separating the cutting tool 101 from the workpiece 201.

Figure 14:
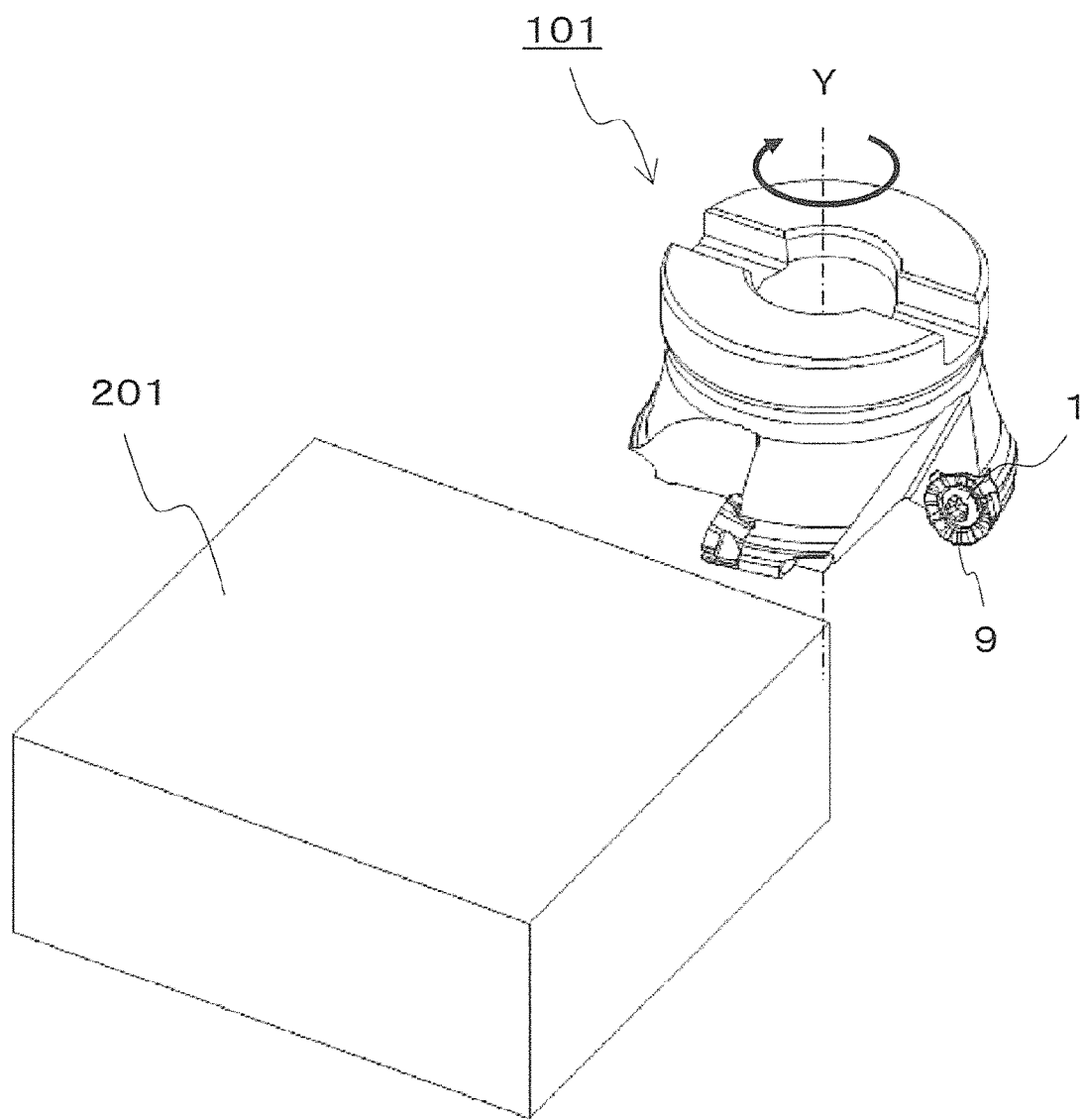
FIG. 14 is a perspective view showing a step of a method of producing a machined product according to an embodiment of the present invention.
Figure 15:
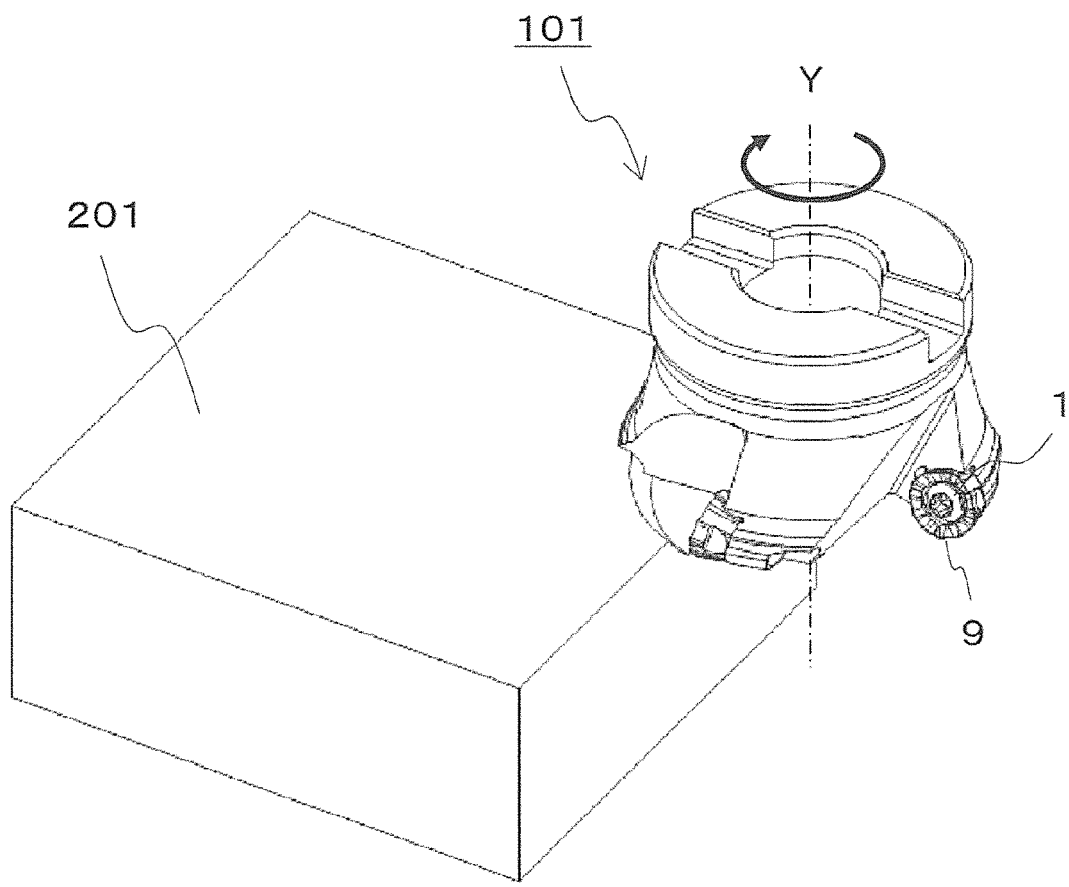
FIG. 15 is a perspective view showing a step of the method of producing a machined product according to the embodiment of the present invention.
Figure 16:
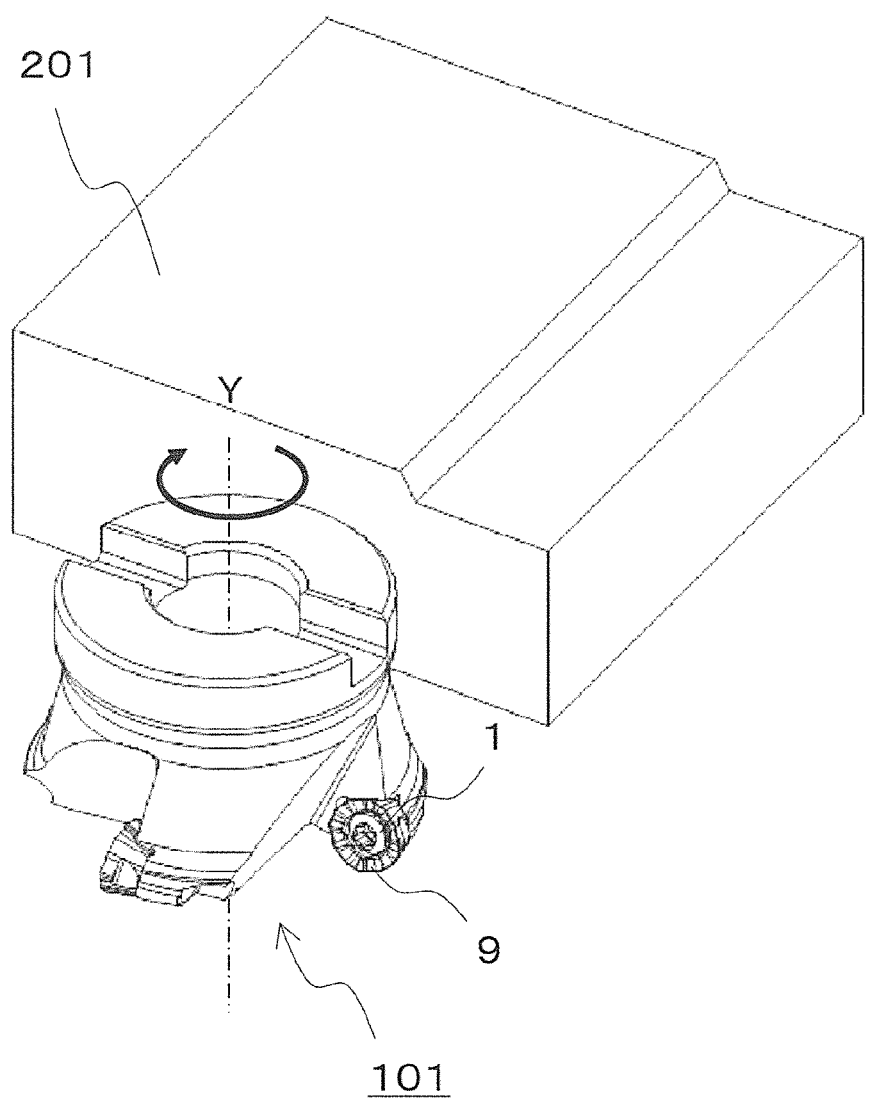
FIG. 16 is a perspective view showing a step of the method of producing a machined product according to the embodiment of the present invention.

More specifically, firstly, the cutting tool 101 is relatively brought near the workpiece 201 while rotating the cutting tool 101 around the rotation center axis Y. Subsequently, the cutting edge 9 of the cutting tool 101 is brought into contact with the workpiece 201 so as to cut the workpiece 201 as shown in FIGS. 14 and 15. Thereafter, the cutting tool 101 is kept relatively away from the workpiece 201 as shown in FIG. 16.

In the present embodiment, the workpiece 201 is fixed and the cutting tool 201 is brought near the workpiece 201. In FIGS. 14 and 15, the workpiece 201 is fixed and the cutting tool 101 is rotated around the rotation center axis Y. In FIG. 16, the workpiece 201 is fixed and the cutting tool 101 is separated from the workpiece 201. The workpiece 201 is fixed and the cutting tool 101 is moved in each of the steps in the cutting process according to the producing method of the present embodiment. This embodiment is illustrated by way of example and without limitation.

For example, in the step (1), the workpiece 201 may be brought near the cutting tool 101. In the step (3), the workpiece 201 may be separated from the cutting tool 101. When the cutting process is continued, it is required to repeat the step of bringing the cutting edge 9 of the cutting insert 1 into contact with different portions of the workpiece 201 while the cutting tool 101 is kept rotating. When the cutting edge 9 in use is worn, an area of the cutting edge 9 which is not used yet may be used by turning the cutting insert 1 through 90 degrees with respect to the central axis of the through hole.

Representative examples of the material of the workpiece 201 include carbon steel, alloy steel, stainless steel, cast iron, and nonferrous metals.

DESCRIPTION OF THE REFERENCE NUMERAL

1: cutting insert
3: upper surface
5: lower surface
7: side surface
9: cutting edge
9a: corner cutting edge
9b: first straight cutting edge
9c: second straight cutting edge
9d: third straight cutting edge
11: through hole
13: land surface
13a: first land surface
13b: second land surface
13c: third land surface
15: rake surface
15a: first inclined surface
15b: second inclined surface
15c: third inclined surface
101: cutting tool
103: holder
105: screw
107: insert pocket
201: workpiece

The invention claimed is:

1. A cutting insert, comprising:
    an upper surface;
    a lower surface;
    a side surface connected to each of the upper surface and the lower surface;
    a cutting edge comprising sequentially a corner cutting edge, a first straight cutting edge, a second straight cutting edge, and a third straight cutting edge, which are located along an intersection of the upper surface and the side surface and intersect one another at an obtuse angle; and
    a through hole extending from a middle part of the upper surface to a middle part of the lower surface,
    wherein the upper surface comprises a first inclined surface that extends along the first straight cutting edge and has a smaller height from a virtual plane orthogonal to a central axis of the through hole as departing from the first straight cutting edge, a second inclined surface that extends along the second straight cutting edge and has a smaller height from the virtual plane as departing from the second straight cutting edge, and a third inclined surface that extends along the third straight cutting edge and has a smaller height from the virtual plane as departing from the third straight cutting edge, and
    wherein an inclination angle of the second inclined surface with respect to the virtual plane is larger than an inclination angle of each of the first inclined surface and the third inclined surface with respect to the virtual plane.

2. The cutting insert according to claim 1,
    wherein the upper surface comprises a first land surface located between the first straight cutting edge and the first inclined surface, a second land surface located between the second straight cutting edge and the second inclined surface, and a third land surface located between the third straight cutting edge and the third inclined surface, and
    wherein a width between the first straight cutting edge and the first inclined surface on the first land surface is larger than each of a width between the second straight cutting edge and the second inclined surface on the second land surface, and a width between the third straight cutting edge and the third inclined surface on the third land surface.

3. The cutting insert according to claim 1, wherein the first straight cutting edge is parallel to the lower surface, and the second straight cutting edge and the third straight cutting edge are inclined so as to have a smaller height from the virtual plane as departing from the first straight cutting edge in a side view.

4. The cutting insert according to claim 1, wherein a length of the second straight cutting edge is larger than a length of the third straight cutting edge, and a length of the first straight cutting edge is larger than the length of the second straight cutting edge in a top view.

5. A cutting tool, comprising:
    a holder having a plurality of insert pockets on a front end side of an outer periphery of the holder; and
    a cutting insert according to claim 1 to be attached to the insert pockets so that the cutting edge projects sidewardly of the holder.

6. A method of producing a machined product, comprising:
    rotating a cutting tool according to claim 5;
    bringing the cutting edge of the cutting tool being rotated into contact with a workpiece; and
    separating the cutting tool from the workpiece.

* * * * *